United States Patent [19]

Bode

[11] 4,012,053
[45] Mar. 15, 1977

[54] SPLASH GUARD

[75] Inventor: Robert G. Bode, Chicago, Ill.

[73] Assignee: Custom Accessories, Inc., Skokie, Ill.

[22] Filed: Sept. 22, 1975

[21] Appl. No.: 615,787

[52] U.S. Cl. .................................. 280/154.5 R
[51] Int. Cl.² .................................. B62D 25/16
[58] Field of Search .......... 280/154.5 R, 153, 12 B;
428/194, 192; 296/152; 52/627, 624, 673

[56] References Cited

UNITED STATES PATENTS

| 1,207,432 | 12/1916 | Nones | 52/627 |
| 1,283,775 | 11/1918 | Howe | 52/627 |
| 2,234,536 | 4/1941 | Muros | 428/194 |

Primary Examiner—Robert R. Song

[57] ABSTRACT

A splash guard comprising a corrosion resistant metal body portion having a permanent, continuous, protective border formed of a plastic material intimately bonded to the body portion on both sides thereof along its entire periphery whereby the normally thin, sharp edges of the body portion are completely covered. The protective border is formed on the body portion of the splash guard by means of a mold wherein a plastic material in liquid form is injected. After the plastic material is cured, a splash guard, in finished, ready-to-package and sell form, is obtained.

3 Claims, 9 Drawing Figures

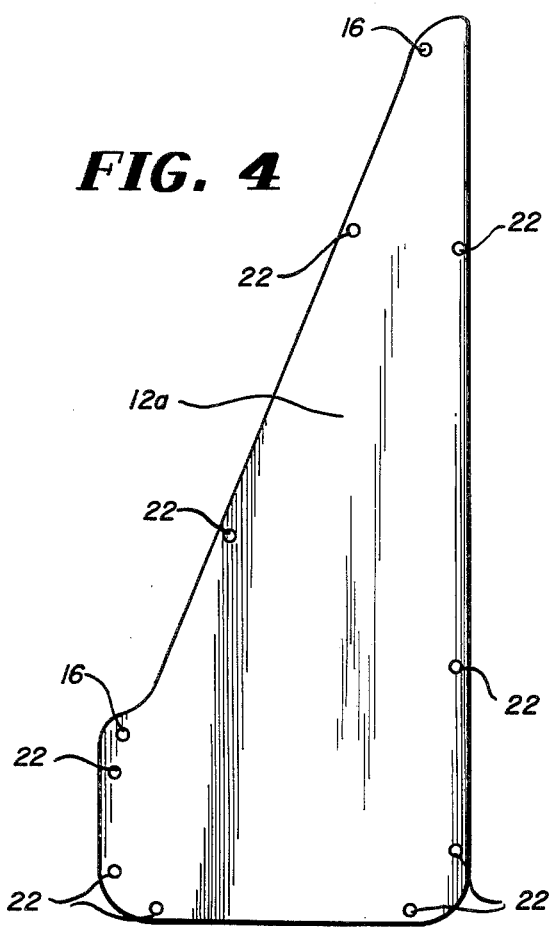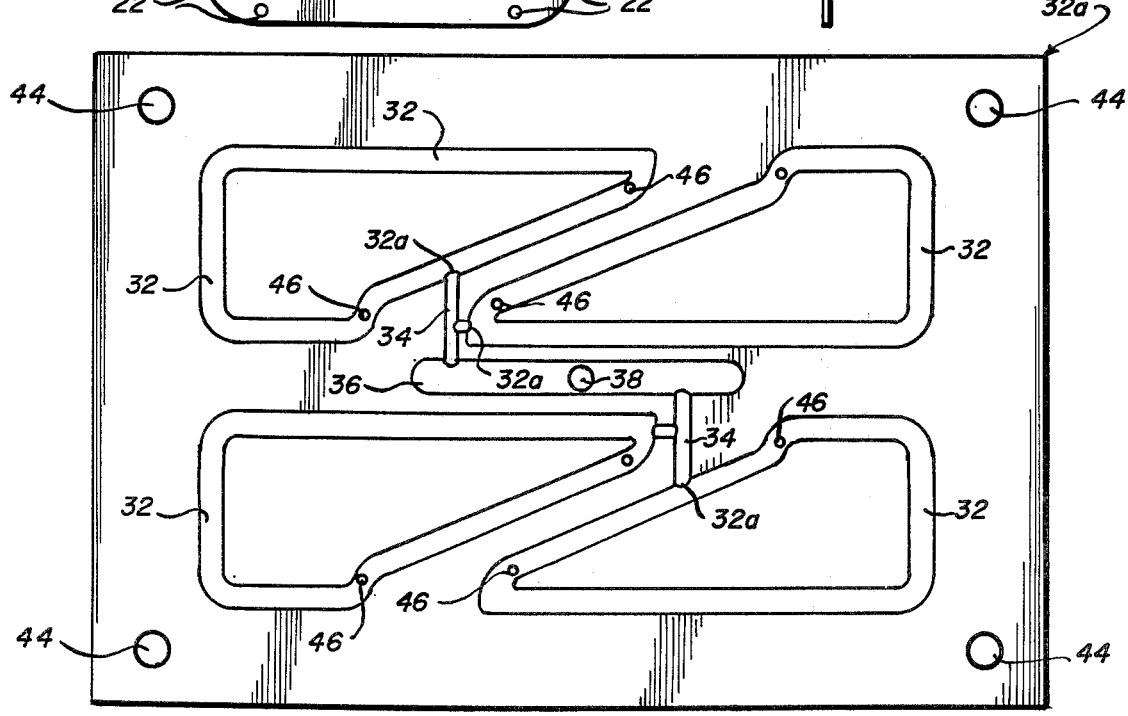
FIG. 4
FIG. 5
FIG. 6

SPLASH GUARD

The present invention relates to an improved splash guard, particularly a splash guard of the type used primarily on the fenders of passenger vehicles, and to a method of producing it.

Splash guards for use on the fenders of passenger cars usually are formed of a single sheet of a corrosion resistant metal such as stainless steel. One edge of the splash guard is shaped to conform to the curvature of the rim of the fender, and is provided with holes which receive screws by means of which the splash guard is secured to a fender. The metal sheet material used in making splash guards is thin gauge. As a result, the outer edges of the splash guards have a knife-like sharpness, and can, and frequently do, cause purchasers to cut their fingers, or hand, both while securing the splash guards on their cars, and while cleaning and/or polishing them after they are installed. In an effort to meet this problem, manufacturers of splash guards have bent, inwardly, the outer, free edges of the guards to provide a bead therearound. This practice has not proven satisfactory because it not only entails changes in the design of the splash guard, but, also, requires special machinery and additional labor both of which result in increased manufacturing costs as well as a higher price for the guards at the retail level. Conventional splash guards, with sharp edges, therefore, are still being made and sold in large numbers, and purchasers of such guards continue to injure themselves. As a result, the product liability problems encountered by retailers of such guards have reached a stage where numbers of them have opted to discontinue selling them.

In accordance with the present invention, an improved splash guard is provided which eliminates completely the possibility of a purchaser of the guard cutting himself on any of the edges thereof. Apart from its unique safety features, the splash guard of this invention has a highly attractive, distinctive, custom appearance which complements the design of both compact and standard sized passenger cars. Over and above these considerations, the splash guard of this invention lends itself to mass production manufacturing techniques at a cost which is comparable to the cost of manufacturing conventional splash guards.

The splash guard, in its preferred form comprises a metal body portion, the outer edges of which are normally thin, and have a knife-like sharpness. The entire periphery of the metal body portion is provided with a permanent, continuous, dull, or blunt, protective border which completely covers the outer edges of the metal body portion. The protective border extends inwardly from the outer edges of the metal body portion, on both sides thereof, and is intimately and strongly bonded to the underlying marginal areas of the metal body portion.

In accordance with the method aspects of the invention, the splash guard is produced by first forming a metal sheet, or blank, into the shape desired. The formed sheet, or blank, which comprises the body portion of the splash guard, is then positioned in a mold in which the edges, and adjacent peripheral areas, only, of the formed sheet, or blank, extend into a channel or cavity provided in the mold for receiving a polymeric or plastic material in liquid form. A multi-cavity mold advantageously is employed to enable the production of more than one splash guard in a single molding operation. A plastic material in liquid form is injected into the mold in an amount sufficient to cover completely the edges and adjacent peripheral areas, only, of the metal sheet, or blank. The injected plastic material, thereafter, is cured to provide a finished, ready-to-package splash guard having the aforementioned characteristics. In accordance with a preferred practice of the method of producing the splash guard, a plurality of spaced holes, openings, or slots, are provided along the periphery of the formed metal sheet, or blank, prior to placing it in the mold. The holes, or openings, enable a permanent, integral link to be formed between the layers of the cured plastic material on each side, along the periphery of the blank, and insures the formation of a strong, intimate bond between the plastic material and the metal substrate.

The foregoing, and other features and advantages of the present invention will be apparent from the following description, reference being made to the accompanying drawings wherein a preferred embodiment of the splash guard is shown. In the drawing:

FIGS. 4 and 5 are side and end views, respectively, of a blank comprising the metal body portion of said embodiment of the splash guard;

FIG. 6 is a plan view of the male section of a mold for use in producing said embodiment of the splash guard;

Figure 1:
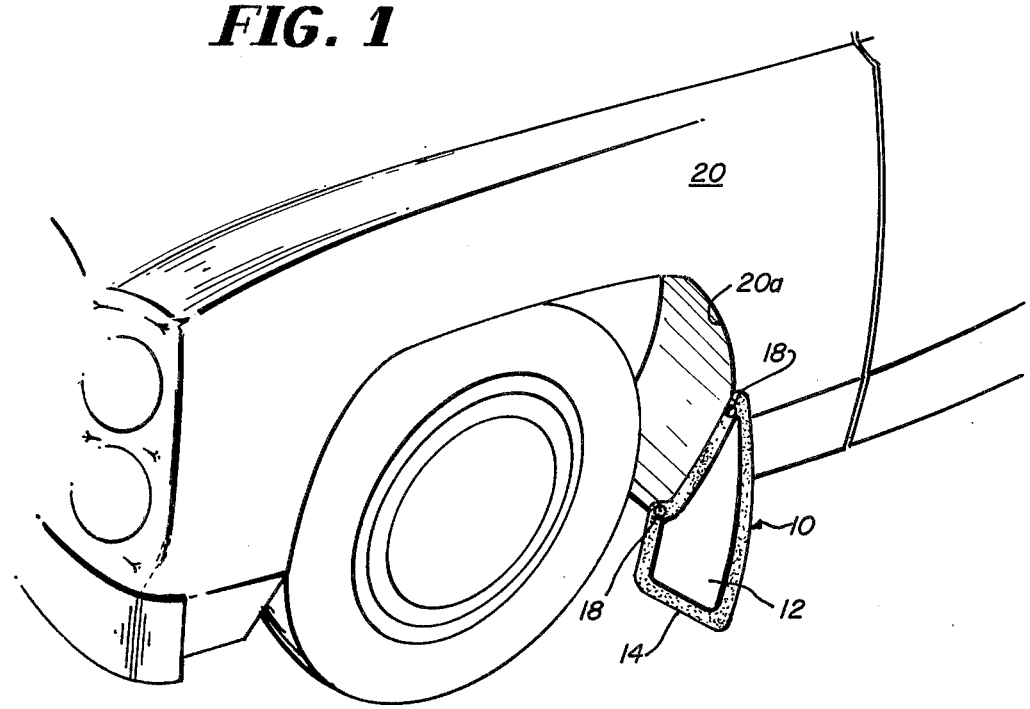
FIG. 1 is a view in perspective showing an embodiment of the splash guard of this invention mounted on the fender of a vehicle.
Figure 2:
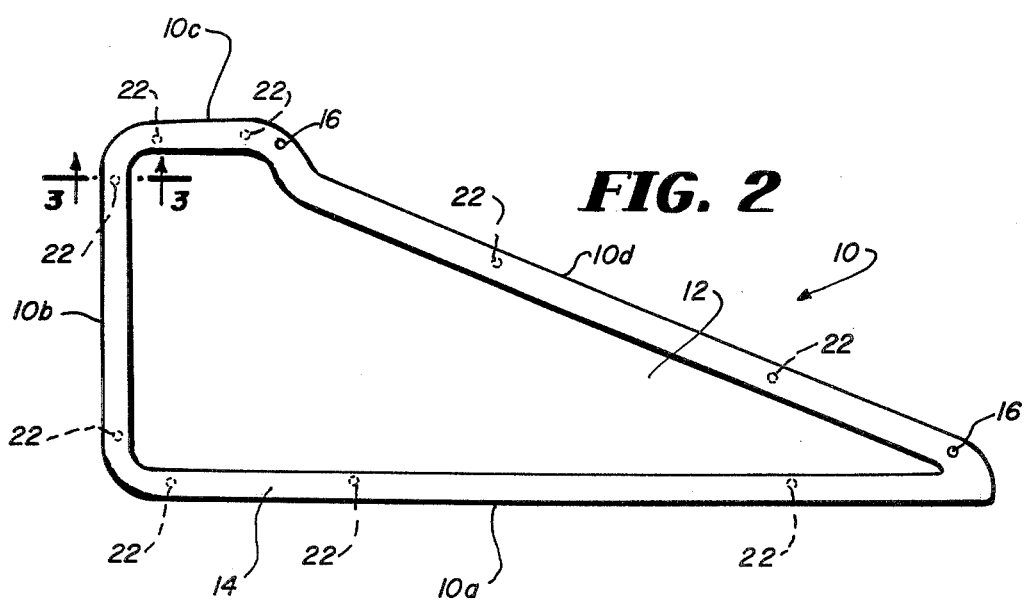
FIG. 2 is a plan view of said embodiment of the splash guard.

Referring, now, to FIGS. 1 and 2 of the drawings, the embodiment of the splash guard illustrated, and designated generally by reference numeral 10, comprises a metal body portion 12 and a permanent, continuous protective border 14 intimately bonded to the entire periphery of the metal body portion. As shown, the guard 10 has an elongated outer side 10a joined to a bottom side 10b. The bottom side 10b, in turn, is joined to a shortened inner side 10c. An angled inner side 10d is joined at its ends to the upper ends of the sides 10a and 10c to impart a somewhat triangular shape to the guard. The angled inner side 10d of the guard 10 is provided with spaced holes 16 therethrough for receiving machine screws 18, for example, by means of which the guard 10 is fastened or secured to the rim 20a of a fender 20 of a vehicle (see FIG. 1).

The metal body portion 12 of the splash guard 10 advantageously is formed of a glossy or shiny corrosion resistant metal such as stainless steel, or chrome-plated sheet steel. The thickness, or gauge, of the metal sheet stock from which the body portion is formed desirably is thin enough to enable it to be flexed to facilitate attachment of the splash guard to the curved rim of a vehicle fender. In accordance with the preferred practice of the invention, the blank 12a comprising the metal body portion 12 of the splash guard 10, has a plurality of spaced holes 22 (see FIG. 4), other than the holes 16 which extend both through the border 14 and the body portion 12, provided along the margins thereof. The holes 22 may be formed in the margins of the blanks 12a at the same time that it is die stamped from metal sheet stock. The spacing of the holes 22 may be random, the important consideration being that a sufficient number of openings be provided. The purpose of the holes 22 will become clear as the description proceeds.

The blank 12a, after it has been formed from metal sheet stock, has thin, knife-like edges which are easily capable of cutting the human skin. As stated, the border 14 of the splash guard of the present invention has eliminated this hazard completely. The border 14 can be formed of various polymeric or plastic materials including polyethylene, polypropylene, teflon, polyamide resins, acrylic resins, to mention a few. Also useful are natural and synthetic rubbers. An especially preferred material is a low density polyethylene available commercially under the trade designation "PETROTHENE" (United States Industrial Chemicals Co.).

In accordance with the method aspects of the present invention, the border 14 is molded directly onto the marginal areas of the blank 12a. To this end, a mold 30, as represented in FIGS. 6–9 of the drawings, is utilized. The mold 30 is a multi-cavity mold comprising two sections, a male section 30a and a female section 30b. Each section of the mold, as shown, has four cavities 32, and each cavity has a gate 32a connected to a runner 34. The runners, in turn, are connected to a well 36 having an orifice or sprue gate 38 for admitting the border forming material into the mold. The sprue gate 38 communicates with a nozzle 40 connected to a source 42 of the border forming material. The male section 30a of the mold has guide pins 44 adapted to be received in openings (not shown) provided in the female section 30b. The male section 30a further is provided with positioning pins 46 which serve to support the blanks 12a in the section 30a. An ejector assembly (not shown) may be provided for the mold to remove the finished splash guards.

Figure 7:
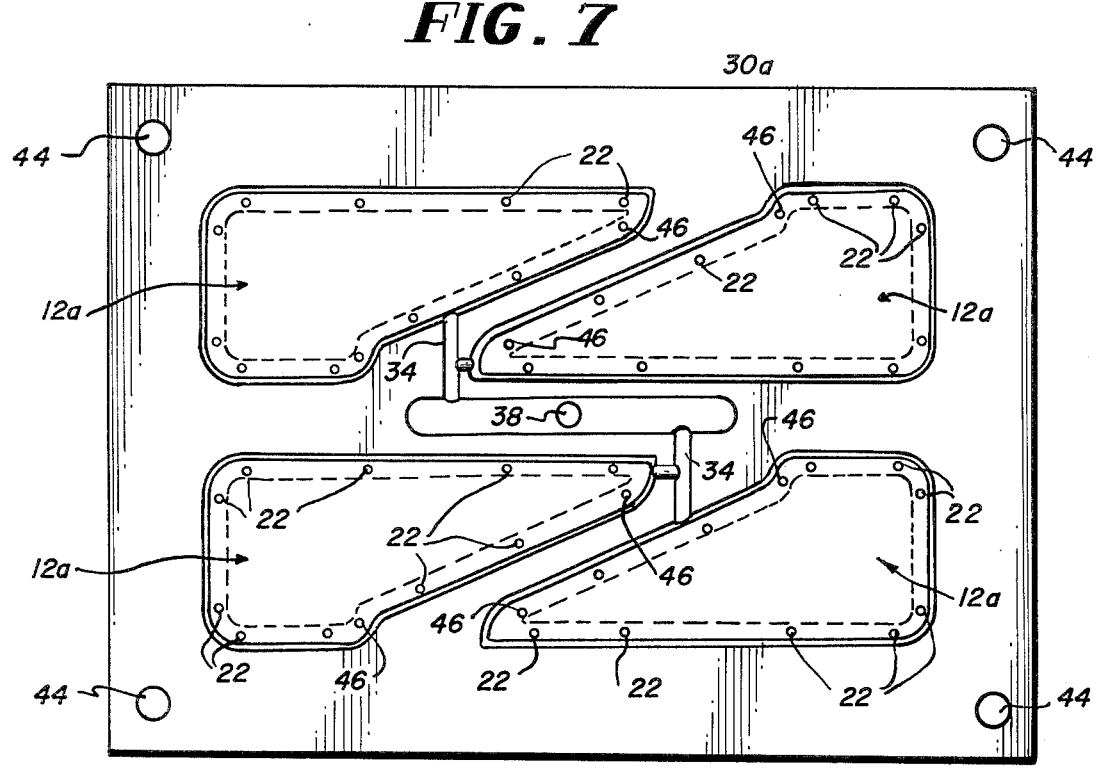
FIG. 7 is a view corresponding to the view of FIG. 6 showing the blanks mounted on said section of the mold.
Figure 8:
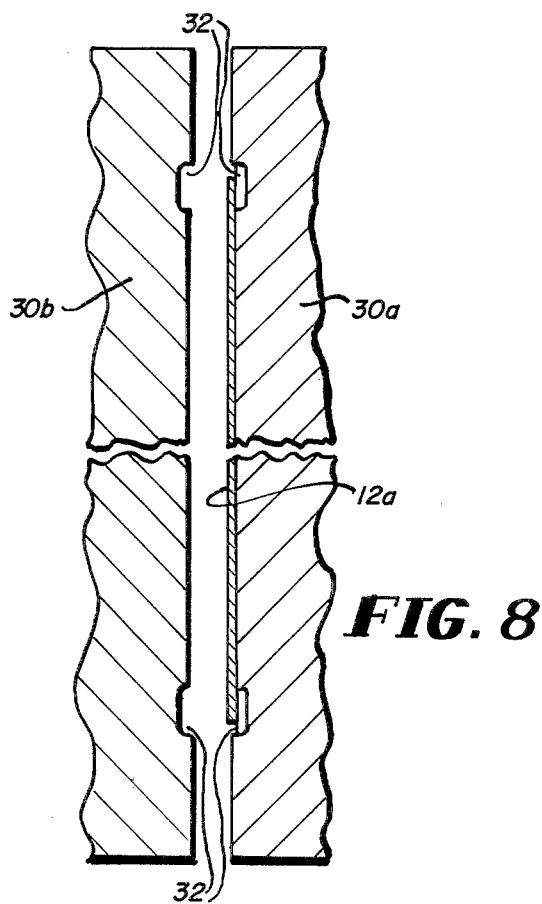
FIG. 8 is an enlarged fragmentary sectional view showing the position of the peripheral areas of a blank in relation to the mold cavities.
Figure 9:
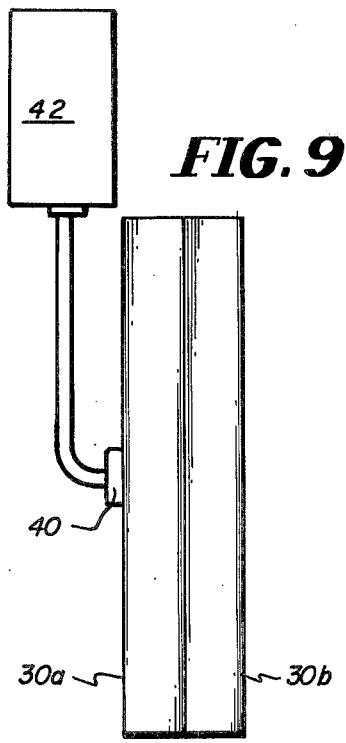
FIG. 9 is a side view in elevation of the mold during injection of a plastic material in liquid form into the mold.

In use, the mold 30 may be in either a horizontal or vertical position. If vertical positioning of the mold is preferred, magnets (not shown) are used in conjunction with the pins 46 for maintaining the blanks 12a in proper orientation with relation to the cavities 32 of the mold. Each blank 12a is first positioned in the mold section 30a as illustrated in FIG. 7, and the other mold section 30a is then brought into engagement with it. Clamping pressures ranging from about 1000 to about 1500, preferably about 1200 psi, are used to maintain the mold sections in position. As shown in FIG. 8, the marginal or peripheral areas, only, of each blank 12a lie within the mold cavities 32 of the sections 30a and 30b.

After the blanks 12a are clamped in position between the mold sections, the border forming material is injected into the mold through the nozzle 40. In utilizing a border forming material such as the aforementioned low density polyethylene sold under the designation "PETROTHENE," the material desirably is introduced into the mold at a temperature in the range of from about 350° C to about 450° C, preferably from about 375° C to about 400° C, under pressure of the order of about 700 to about 900, usually about 800 psi.

Figure 3:
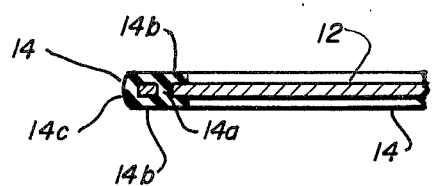
FIG. 3 is a sectional view taken substantially along line 3—3 of FIG. 2.

The hot, melted material completely fills the cavities 32 and engulfs the entire marginal areas on both sides of the blanks 12a. It is important to note that the border forming material flows through the holes 22 formed in each blank 12a. Thus, when the mold is chilled to harden or cure the border forming material, a plurality of integral, homogeneous, and permanent links or connections 14a will be provided between the layers 14b—14b of plastic material along the marginal areas on each side of the finished splash guard 10 (see FIG. 3). A rounded, blunt bead 14c integrally joined to the layers 14b—14b, completely covers the thin, sharp edges of the body portion 12.

The thinness, usually about 0.016 inch, of the metal from which the blanks 12a are formed, coupled with the clamping pressure employed, prevents the border forming material from leaving the cavities 32.

After the border forming material has been hardened or cured, the completed splash guards are ejected, or otherwise removed from the mold. Since essentially no flash is formed around the border during molding, the only finishing step required is the severing of the border forming material at the gate 32a of each cavity 32. The holes 16, by means of which the splash guard is secured to a fender, remain after each guard is removed from the positioning pins 46. The entire cycle, that is, from the time the blanks 12a are positioned in the mold 30 to the time the finished product is removed, requires approximately 60 seconds.

While the invention has been described and illustrated in connection with a preferred embodiment thereof, and a method of making said embodiment, it should be understood that various modifications may be made therein without departing from the broader aspects of the invention.

What is claimed is:

1. A splash guard for attachment to the normally curved fender of a vehicle consisting of: a resilient, flexible, splash-prevention, one-piece body portion, the outer edges of which are normally thin and have a knifelike sharpness, a permanent, unitary, continuous, flexible, protective border intimately bonded to and covering entirely the outer edges of the one-piece body portion to prevent contact by the hand of a user of the splash guard with the normally thin and sharp edges of the body portion, said protective border having substantially flattened sides which extend inwardly from the outer edges of the body portion and overlie only the marginal areas of the body portion adjacent to the outer edges thereof on both sides of the body portion, said protective border being formed of a material which is different from the material of which the body portion is formed and being flexible with and remaining intimately bonded to the outer edges of the body portion when the splash guard is flexed to enable it to conform to the normal curvature of a fender of a vehicle, and spaced openings through the protective border and the body portion along a margin of the splash guard for receiving fasteners by means of which the splash guard is attached to the fender of a vehicle.

2. A splash guard according to claim 1 wherein the protective border is formed from a thermoplastic material.

3. A splash guard according to claim 1 wherein the body portion is formed of a corrosion resistant metal.

* * * * *